United States Patent [19]
Griffiths

[11] 3,960,311

[45] June 1, 1976

[54] BACKING RING ASSEMBLY FOR PIPES

[75] Inventor: Raymond Paul Griffiths, Melton Nowbray, England

[73] Assignee: Welding Controls Limited, Northampton, England

[22] Filed: Nov. 25, 1974

[21] Appl. No.: 526,839

[30] Foreign Application Priority Data
Nov. 27, 1973 United Kingdom............... 55038/73

[52] U.S. Cl.................................... 228/49; 228/50; 228/216

[51] Int. Cl.² ........................................... B23K 5/22

[58] Field of Search......................... 228/49, 50, 216; 29/491, 200 P, 234, 272

[56] References Cited
UNITED STATES PATENTS
1,964,926   7/1934   Moss..................................... 228/50

Primary Examiner—Al Lawrence Smith
Assistant Examiner—Margaret Joyce
Attorney, Agent, or Firm—McCaleb, Lucas & Brugman

[57] ABSTRACT

A backing and alignment ring assembly for insertion in pipes, particularly for welding purposes, comprising a segmented backing ring and a pair of axially spaced hub members connected to the backing ring by radially and axially extending connecting means. When the hub members are drawn together the backing ring is caused to expand and engage with the pipe bore.

17 Claims, 8 Drawing Figures

BACKING RING ASSEMBLY FOR PIPES

BACKGROUND OF THE INVENTION

1. Field of the Invention

This invention relates to a backing and alignment ring assembly for insertion in pipes, more particularly for alignment of abutting pipe ends for welding.

2. Description of the Prior Art

When pipes are to be welded together, it is desirable that their abutting ends should be as accurately aligned as possible. Known externally mounted means of alignment may interfere with accessibility to the joint to be welded if disposed too near the joint, and are therefore unsuitable for providing rigid alignment close to the joint.

At the same time, there is a requirement in certain forms of welding for a backing piece on the opposite side of the metal to that on which the weld is being applied, which acts as a heat sink and controls the flow of weld metal.

BRIEF SUMMARY OF THE INVENTION

An object of the invention is to provide internally mountable means for aligning abutting pipe ends which also serves as a backing piece when welding the ends together.

According to the present invention there is provided a backing and alignment ring assembly comprising a segmented backing and alignment ring for engagement in a pipe bore, a pair of spaced hub members located substantially on the axis of the ring, axially extending actuating means connected to the hub members for providing relative axial movement of the hub members, and radially and axially extending connecting means attaching each hub member to the ring whereby said relative axial movement of the hub members produces radial expansion or contraction of the ring.

The actuating means may conveniently comprise a rod connected to one hub, and a coaxial tube slidably surrounding the rod and connected to the other hub.

Alternatively the actuating means may comprise a hydraulic or pneumatic piston and cylinder arrangement disposed between the hub members, pressure for actuating the piston being applied from an external source through a hose connected to the cylinder. If a flexible hose is used, the backing and alignment ring assembly may then be passed round bends in a pipe by means of either a pull-through cord or the hose itself.

Preferably the connecting means between the hub members and the segmented ring may comprise a plurality of resilient elements which together conform in an un-stressed condition to the shape of a cone and converge and terminate in the hub member, and at the base of the cone may be located in an annular groove in the corresponding side of the segmented ring.

BRIEF DESCRIPTION OF THE DRAWINGS

The invention will now be more particularly described by way of example with reference to the accompanying drawings, in which.

DETAILED DESCRIPTION OF THE PREFERRED EMBODIMENTS

Figure 1:
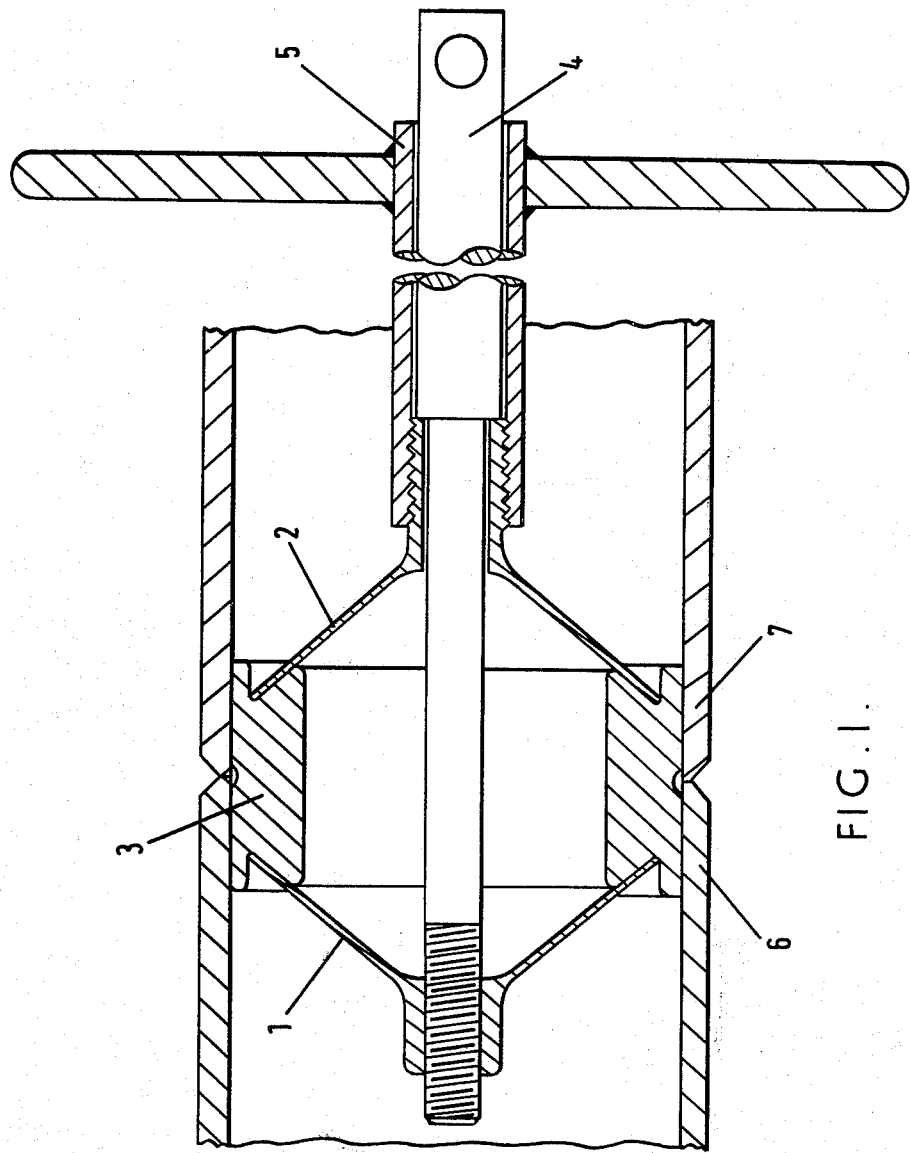
FIG. 1 shows an axial cross-section of a backing ring assembly at the interface of two abutting pipe ends.

In FIG. 1, resilient conical members 1 and 2 are located coaxial with and on opposite sides of a segmented backing ring 3. A rod 4 has a threaded end portion screwed into the hub of the member 1, and a tube 5, coaxial with rod 4, is screwed on to the hub of member 2 by means of corresponding threads. The conical members 1 and 2 are provided with radial slits to form a plurality of resilient elements located in annular grooves on respective sides of the segmented ring 3.

The segmented ring 3 is located at the interface of two abutting pipe ends 6 and 7, and when rod 4 is rotated relative to tube 5, which serves to prevent rotation of the backing ring assembly, the threaded end portion is screwed further into the hub of member 1 causing the hubs of each member to be drawn together. The diameter of the wider ends of conical members 1 and 2 is thereby increased and the segmented ring expands to clamp against the bores of pipe ends 6 and 7.

Apart from holding the pipe ends 6 and 7 in concentric alignment for welding, the backing ring also provides an effective heat-sink enabling consistent weld penetration to be achieved. After the welding operation, rod 4 is rotated relative to tube 5 to release the backing ring from the pipe bore, and the assembly is withdrawn.

The conical members are preferably made of heat treatable stainless steel, but other heat resisting materials can be used. The backing ring segments may be precision cast in stainless steel or copper alloy, but alternative materials including ceramics may be employed. The backing ring is easily replaceable if it becomes worn or damaged, and together with corresponding conical members can be made to suit any size of pipe.

Figure 2:
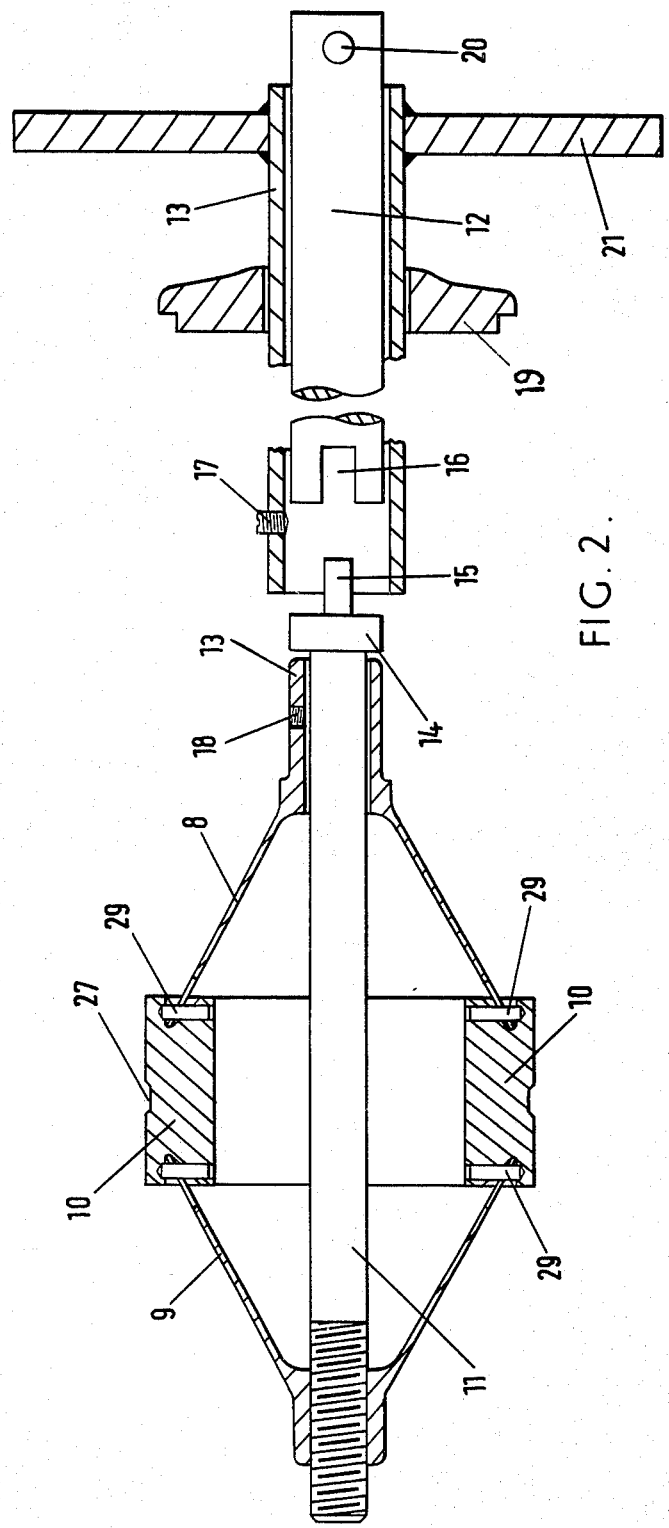
FIG. 2 shows in axial cross-section an alternative form of assembly which is self-contained with respect to external actuating means.

FIG. 2 shows a modified assembly in which the conical members 8 and 9 and backing ring 10 together with an actuating rod 11 form a self-contained unit. Separate co-operating rod 12 and tube 13 are provided for rotating the rod 11 relative to the conical members. The rod 11 bears on the hub 13 of the member with an annular flange 14 and is provided with a lug 15 engageable in a slot 16 formed in the end of the rod 12. The tube 13 has a screw 17 mounted in a threaded hole for engagement in a corresponding hole 18 in the hub 13 to prevent rotation of the conical members.

Rods and tube combinations of any length may be selected for use with the self-contained assembly.

Furthermore a disc 19 is adjustably mounted on the tube 13 and, by engagement with a free end of a pipe to be welded, serves to locate the backing ring 10 precisely at the required position for welding. Bars 20 and 21 are provided on the rod 12 and tube 13 respectively for effecting their relative rotation.

Figure 3:
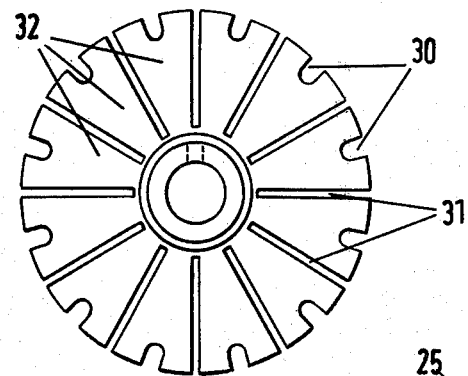
FIG. 3 is a view of a conical member 8 or 9 as seen along the axis of the assembly of FIG. 2.
Figure 4:
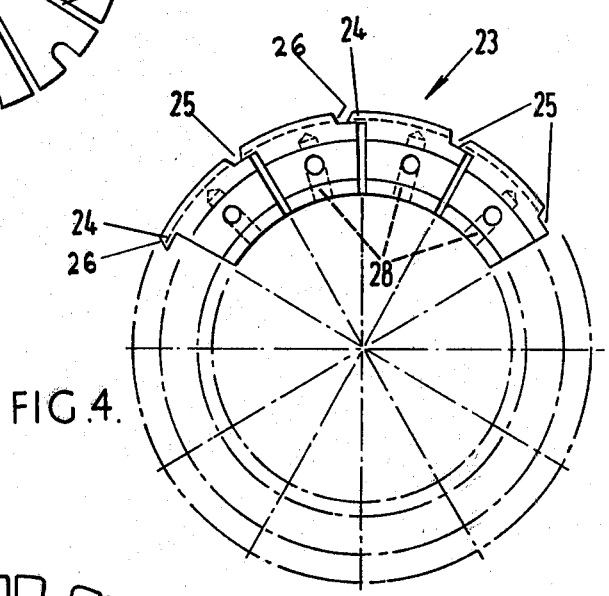
FIG. 4 is a view of segments 23 of the backing ring 10 as seen along the axis of the assembly of FIG. 2.

FIGS. 3 and 4 are axial views of the conical member 8 and backing ring segments 23 respectively.

The backing ring 10 is formed of twelve such segments 23, each of which is provided with interengaging lips 24 and recesses 25. These serve to prevent weld metal from flowing inside the assembly and preventing its removal from the pipes being welded. Furthermore the lips 24 and recesses 25 are provided with angled faces 26 to assist in the separation of any weld metal from the segments 23 when the backing ring is contracted after use. As shown in FIG. 2, the backing ring 10 is also provided with a circumferential groove 27 to allow build-up of a bead of weld metal on the inside of the weld.

In order to keep the backing ring segments 23 evenly distributed, each segment is provided with a bore 28 (FIG. 4) adapted to receive a pin 29 (FIG. 2), and the circumference of each conical member is provided with a corresponding number of slots 30 (FIG. 3) in which the pins engage.

FIG. 3 also shows radial slits 31 forming segments 32 in the conical member, equal in number to the backing ring segments, thereby allowing the conical member to be axially compressed and radially spread out simultaneously.

Figure 5:
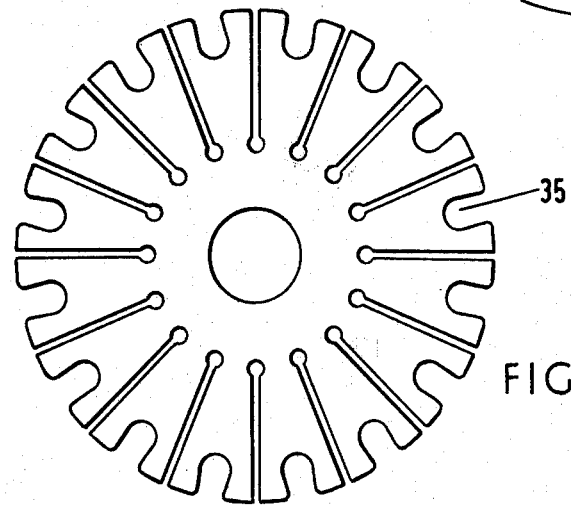
FIG. 5 shows an alternative form of conical member.
Figure 6:
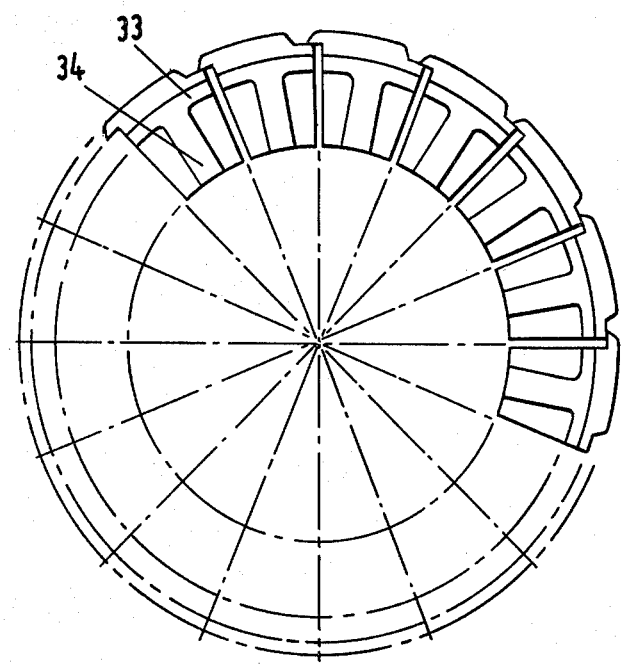
FIG. 6 shows backing ring segments corresponding to the conical member of FIG. 5.
Figure 7:
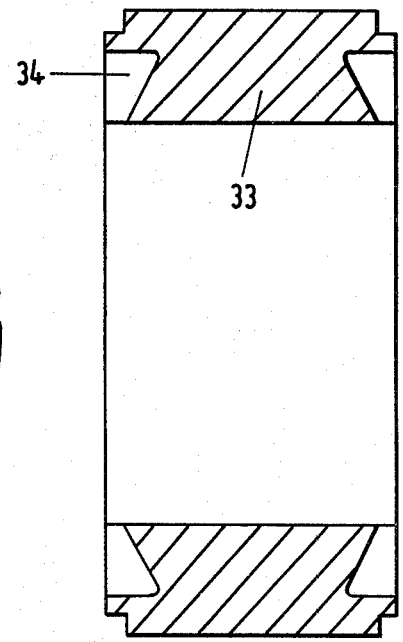
FIG. 7 shows an axial cross-section of the segments of FIG. 6.

FIGS. 5, 6 and 7 show a larger conical member and backing ring segments for co-operation therewith. In this case 16 segments are used, and each backing ring segment 33 is provided with a flange 34 locating in a recess 35 of the conical member, as an alternative means of locating the segments to the pin 29 in FIG. 2.

Figure 8:
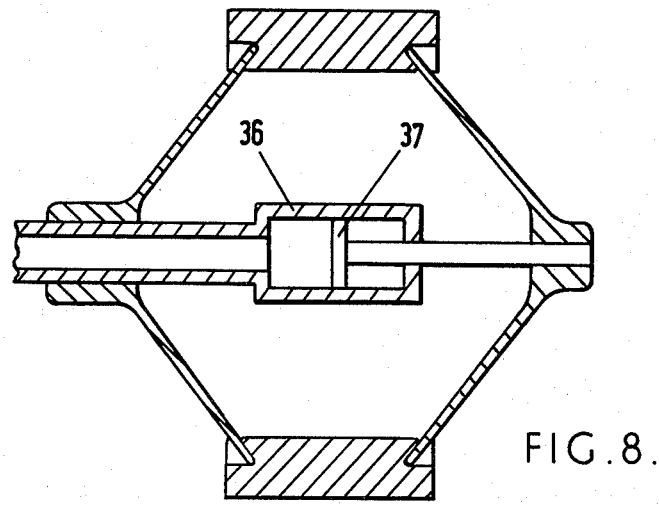
FIG. 8 shows diagrammatically how a piston and cylinder arrangement may be incorporated in a backing ring assembly.

FIG. 8 shows diagrammatically how a hydraulically or pneumatically operated cylinder 36 and piston 37 arrangement may be used to displace the hubs of the conical members as an alternative to mechanical actuation as described above. If connected to flexible hydraulic piping, this assembly may be passed around bends in pipes.

While preferred forms of the invention have been shown and described, it will be understood that various modifications may be made within the spirit and scope of the invention which should be limited only by the appended claims.

I claim:

1. A backing and alignment ring assembly comprising a segmented backing ring having a cylindrical external surface for engagement in a pipe bore the segments of said ring being provided with inter-engaging and overlapping lips and recesses on said surface, a pair of spaced hub members located substantially on the axis of the ring, axially extending actuating means connected to the hub members for providing relative axial movement of the hub members, and radially and axially extending connecting means attaching each hub member to the ring whereby said relative axial movement of the hub members produces radial expansion or contraction of the ring.

2. The assembly of claim 1 wherein the connecting means between each hub member and the segmented ring comprises a plurality of resilient elements which in an un-stressed condition lie on a conical surface and converge and terminate in the hub member.

3. The assembly of claim 2 wherein said resilient elements are formed from a thin-walled frusto-conical member provided with a plurality of radially extending slits.

4. The assembly of claim 1 wherein the backing ring is provided on each axially facing side with an annular groove for engagement with the associated connecting means.

5. The assembly of claim 1 wherein the sides of said lips and recesses provided on said external surface of said ring are inclined relative to said external surface.

6. The assembly of claim 2 wherein the number of segments of the backing ring is equal to the number of resilient elements, and inter-engaging locating means are provided on the resilient elements and the backing ring segments for keeping the segments equally distributed with respect to the resilient elements.

7. The assembly of claim 1 wherein the actuating means comprises a rod connected to one hub member, and a coaxial tube slidably surrounding the rod and connected to the other hub member.

8. The assembly of claim 7 wherein the rod is provided at one end with a threaded portion engaged in a threaded hole in said one hub member.

9. The assembly of claim 8 wherein the tube is integrally formed with said other hub member and the rod is provided with an annular flange engageable with the external end of said tube and a lug for location with an external actuating rod having a corresponding slot, the tube being engageable with an external actuating tube whereby the assembly forms a self-contained unit with respect to the external rod and tube.

10. The assembly of claim 1 wherein the actuating means comprises a hydraulic or pneumatic piston and cylinder arrangement disposed between the hub members, pressure for actuating the piston being applied from an external source through a hose connected to the cylinder.

11. A backing ring assembly comprising a segmented backing ring for engagement in a pipe bore, a pair of spaced hub members located substantially on the axis of the ring, axially extending actuating means connected to the hub members for providing relative axial movement of the hub members, and connecting means attaching each hub member to the ring comprising a plurality of resilient elements which in an un-stressed condition lie on a conical surface and converge and terminate in the hub member, said resilient elements being formed from a thin-walled frusto-conical member provided with a plurality of radially extending slits whereby said relative axial movement of the hub members produces radial expansion or contraction of the ring.

12. The assembly of claim 11 wherein the backing ring is provided on each axially facing side with an annular groove for engagement with the associated connecting means.

13. The assembly of claim 11 wherein the number of segments of the backing ring is equal to the number of resilient elements, and inter-engaging locating means are provided on the resilient elements and the backing ring segments for keeping the segments equally distributed with respect to the resilient elements.

14. The assembly of claim 11 wherein the actuating means comprises a rod connected to one hub member, and a coaxial tube slidably surrounding the rod and connected to the other hub member.

15. The assembly of claim 14 wherein the rod is provided at one end with a threaded portion engaged in a threaded hole in said one hub member.

16. The assembly of claim 15 wherein the tube is integrally formed with said other hub member, and the rod is provided with an annular flange engageable with the external end of said tube and a lug for location with an external actuating rod having a corresponding slot, the tube being engageable with an external actuating tube whereby the assembly forms a self-contained unit with respect to the external rod and tube.

17. The assembly of claim 11 wherein the actuating means comprises a hydraulic or pneumatic piston and cylinder arrangement disposed between the hub members, pressure for actuating the piston being applied from an external source through a hose connected to the cylinder.

* * * * *